(12) United States Patent
Gulati et al.

(10) Patent No.: US 11,356,163 B2
(45) Date of Patent: Jun. 7, 2022

(54) MULTIPLEXING OF CSI WITH SL-SCH FOR SIDELINK COMMUNICATIONS

(71) Applicant: QUALCOMM Incorporated, San Diego, CA (US)

(72) Inventors: Kapil Gulati, Montgomery, NJ (US); Sudhir Kumar Baghel, Hillsborough, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/061,269

(22) Filed: Oct. 1, 2020

(65) Prior Publication Data

US 2021/0105054 A1 Apr. 8, 2021

Related U.S. Application Data

(60) Provisional application No. 62/911,095, filed on Oct. 4, 2019.

(51) Int. Cl.
*H04B 7/06* (2006.01)
*H04W 72/04* (2009.01)
(Continued)

(52) U.S. Cl.
CPC ......... *H04B 7/0626* (2013.01); *H04B 7/0486* (2013.01); *H04B 7/0632* (2013.01);
(Continued)

(58) Field of Classification Search
CPC .. H04B 7/0626; H04B 7/0486; H04B 7/0632; H04B 7/0639; H04L 1/0003; H04L 5/0051; H04L 5/0055; H04W 72/0406
See application file for complete search history.

(56) References Cited

U.S. PATENT DOCUMENTS

2020/0084783 A1* 3/2020 Li ................... H04L 5/0053

FOREIGN PATENT DOCUMENTS

WO WO-2020033704 A1 * 2/2020 ........... H04L 5/0053

OTHER PUBLICATIONS

CATT "SCI Design for Sidelink", 3GPP Draft, 3GPP TSG RAN WG1 Meeting #98, R1-1908588, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765196, 6 Pages, Retrieved from the Internet: URL:http://www.3gpp.org/ftp/tsg_ran/WG1_RL1/TSGR1_98/Docs/R1-1908588.zip [retrieved on Aug. 17, 2019] par.2.2.

(Continued)

*Primary Examiner* — Brian P Cox
(74) *Attorney, Agent, or Firm* — Arent Fox, LLP

(57) ABSTRACT

In an aspect, the present disclosure includes a method, apparatus, and computer readable medium for wireless communications for transmitting, by a network entity to a user equipment (UE), a first sidelink control message (CCH-1), wherein the CCH-1 includes at least control information that indicates a resource allocation of data and decoding information for decoding a second sidelink control message (CCH-2); transmitting, by the network entity to the UE, the CCH-2, wherein the CCH-2 includes one or more of control information for decoding data and one or more channel state information (CSI) reports; and transmitting, by the network entity to the UE, the data based on the CCH-1 and CCH-2.

30 Claims, 10 Drawing Sheets

(51) Int. Cl.
 *H04L 5/00* (2006.01)
 *H04L 1/00* (2006.01)
 *H04B 7/0456* (2017.01)

(52) U.S. Cl.
 CPC ......... *H04B 7/0639* (2013.01); *H04L 1/0003* (2013.01); *H04L 5/0051* (2013.01); *H04L 5/0055* (2013.01); *H04W 72/0406* (2013.01)

(56) References Cited

OTHER PUBLICATIONS

Futurewei: "Two-Stage SCI Design and Adaptive DMRS Support for Sidelink", 3GPP Draft, 3GPP TSG RAN WG1 Meeting #98, R1-1908737, 3rd Generation Partnership Project (3GPP), Mobile Competence Centre, 650, Route Des-Lucioles, F-06921 Sophia-Antipolis Cedex, France, vol. RAN WG1, No. Prague, Czech Republic, Aug. 26, 2019-Aug. 30, 2019 Aug. 15, 2019 (Aug. 15, 2019), XP051765345, 6 Pages, Retrieved from the Internet: URL:http://www.3gpp.org/ftp/tsg_ran/WG1_RL1/TSGR1_98/Docs/R1-1908737.zip. [retrieved on Aug. 15, 2019], par.2.

Intel Corporation: "Physical Structure for NR V2X", 3GPP Draft, 3GPP TSG RAN WG1 Meeting #98, R1-1908633 INTEL—EV2X SL L1, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019 Aug. 17, 2019 (Aug. 17, 2019), XP051765241, pp. 1-24, Retrieved from the Internet: URL:http://www.3gpp.org/ftp/tsg_ran/WG1_RL1/TSGR1_98/Docs/R1-1908633.zip [retrieved on Aug. 17, 2019] par.3.

International Search Report and Written Opinion—PCT/US2020/054119—ISA/EPO—dated Feb. 1, 2021.

LG Electronics: "Discussion on Physical Layer Structure for NR Sidelink", 3GPP Draft, 3GPP TSG RAN WG1 #97, R1-1907012, Discussion on Physical Layer Structure for NR Sidelink, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728460, 25 Pages, Retrieved from the Internet: URL: http://www.3gpp.org/ftp/Meetings%5F3GPP%5FSYNC/RAN1/Docs/R1%2D1907012%2Ezip [retrieved on May 13, 2019] par. 2.3.

* cited by examiner

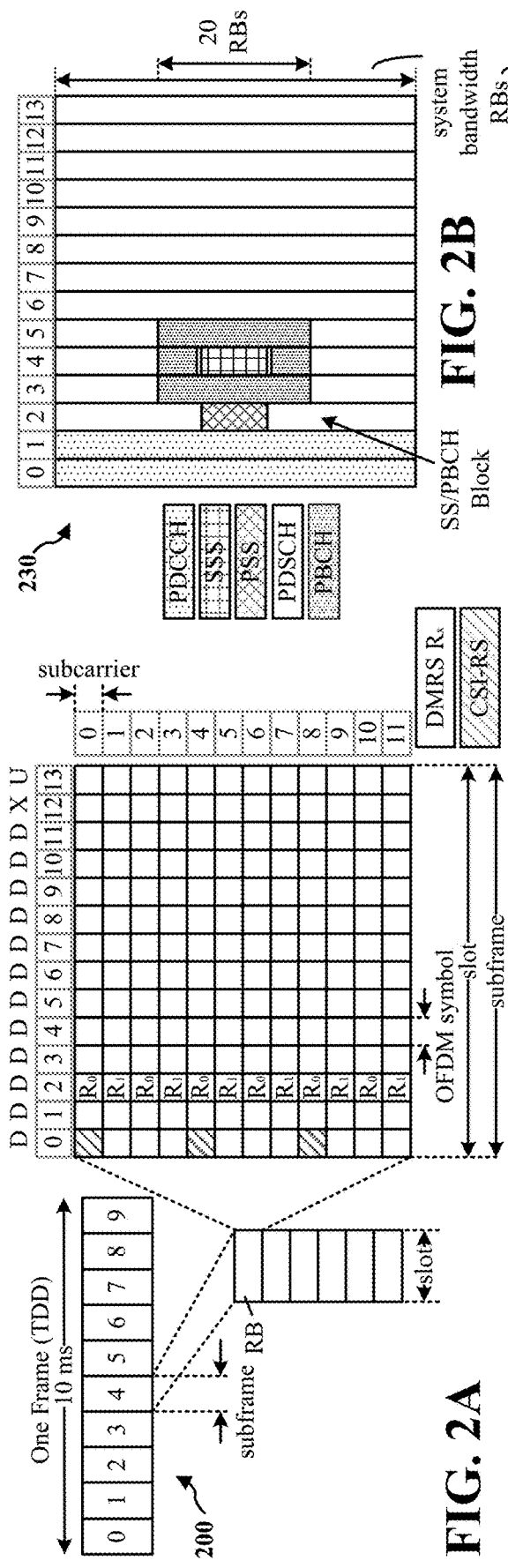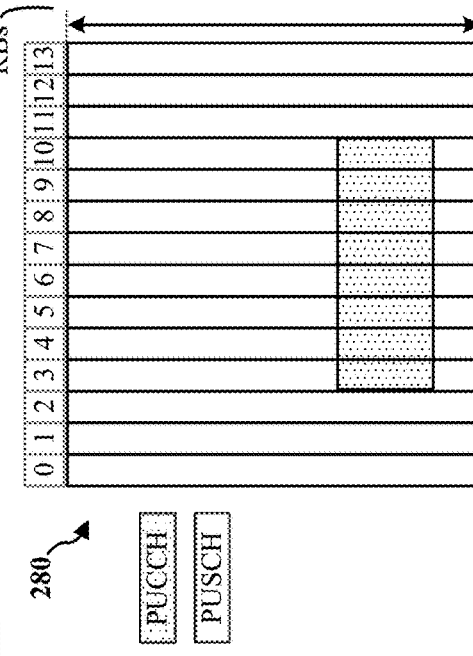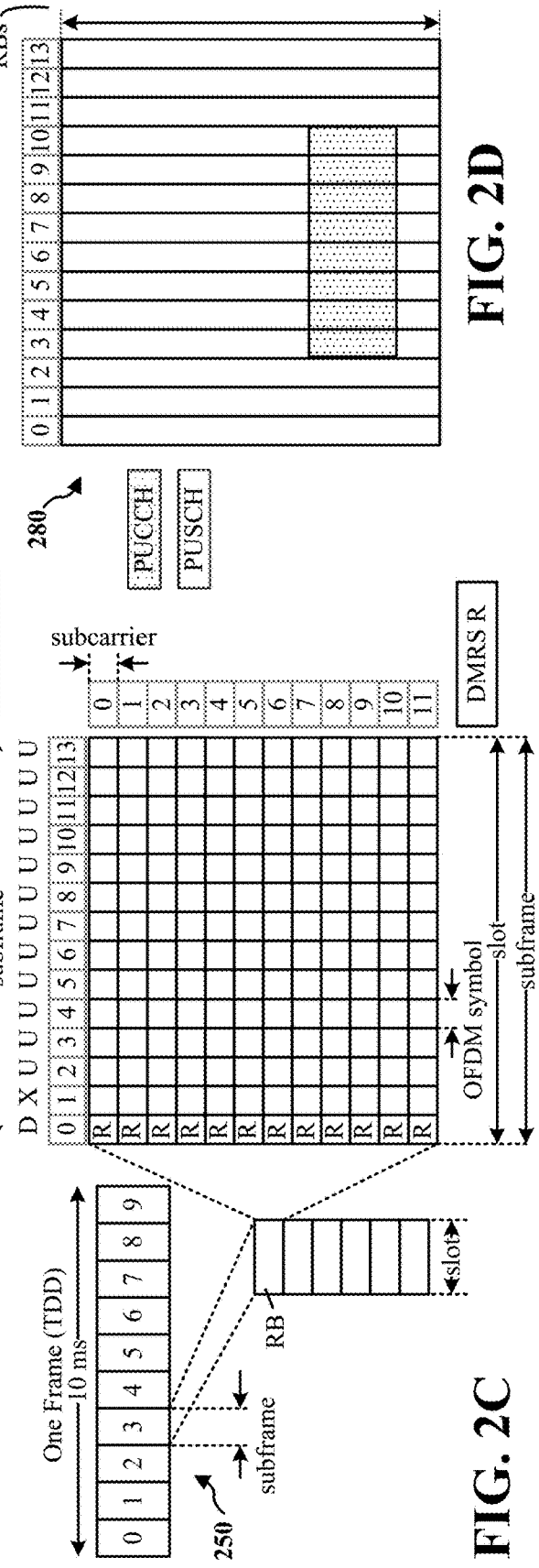

MULTIPLEXING OF CSI WITH SL-SCH FOR SIDELINK COMMUNICATIONS

CROSS-REFERENCE TO RELATED APPLICATION(S)

The present application claims benefit of U.S. Provisional Application No. 62/911,095 entitled "MULTIPLEXING OF CSI WITH SL-SCH FOR SIDELINK COMMUNICATIONS" filed Oct. 4, 2019, which is assigned to the assignee hereof and hereby expressly incorporated by reference herein.

INTRODUCTION

The present disclosure relates generally to communication systems, and more particularly, to sidelink channel state information (CSI) transmission multiplexing with a shared channel (SCH) for sidelink communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In such systems, the synchronization mechanism (e.g., timing and/or frequency synchronization) for a user equipment (UE) may be based on a connection to a global navigation satellite system (GNSS) or a cellular base station. Alternatively, in absence of a connection with a GNSS or base station, the synchronization for a UE may require sidelink synchronization with another UE that is already synchronized to a GNSS or base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes transmitting, by a network entity to a user equipment (UE), a first sidelink control message (CCH-1), wherein the CCH-1 includes at least control information that indicates a resource allocation of data and decoding information for decoding a second sidelink control message (CCH-2); transmitting, by the network entity to the UE, the CCH-2, wherein the CCH-2 includes one or more of control information for decoding data and one or more channel state information (CSI) reports; and transmitting, by the network entity to the UE, the data based on the CCH-1 and CCH-2.

Another example implementation includes an apparatus for wireless communication, including a processor and a memory in communication with the processor. The memory storing instructions which, when executed by the processor, cause the processor to transmit, by a network entity to a UE, a CCH-1, wherein the CCH-1 includes at least control information that indicates a resource allocation of data and decoding information for decoding a CCH-2; transmit, by the network entity to the UE, the CCH-2, wherein the CCH-2 includes one or more of control information for decoding data and one or more CSI reports; and transmit, by the network entity to the UE, the data based on the CCH-1 and CCH-2.

Another example implementation includes an apparatus for wireless communication, including means for transmitting, by a network entity to a UE, a CCH-1, wherein the CCH-1 includes at least control information that indicates a resource allocation of data and decoding information for decoding a CCH-2; means for transmitting, by the network entity to the UE, the CCH-2, wherein the CCH-2 includes one or more of control information for decoding data and one or more CSI reports; and means for transmitting, by the network entity to the UE, the data based on the CCH-1 and CCH-2.

Another example implementation includes a non-statutory computer-readable medium storing instructions for wireless communication, executable by a processor to transmit, by a network entity to a UE, a CCH-1, wherein the CCH-1 includes at least control information that indicates a resource allocation of data and decoding information for decoding a CCH-2; transmit, by the network entity to the UE, the CCH-2, wherein the CCH-2 includes one or more of control information for decoding data and one or more CSI reports; and transmit, by the network entity to the UE, the data based on the CCH-1 and CCH-2.

In another example, a method of wireless communication is provided. The method includes receiving, by a UE from a network entity, a CCH-1, wherein the CCH-1 includes at least control information that indicates a resource allocation of data and decoding information for decoding a CCH-2;

receiving, by the UE from the network entity, the CCH-2, wherein the CCH-2 includes one or more of control information for decoding data and one or more CSI reports; and receiving, by the UE from the network entity, the data based on the CCH-1 and CCH-2.

Another example implementation includes an apparatus for wireless communication, including a processor and a memory in communication with the processor. The memory storing instructions which, when executed by the processor, cause the processor to receive, by a UE from a network entity, a CCH-1, wherein the CCH-1 includes at least control information that indicates a resource allocation of data and decoding information for decoding a CCH-2; receive, by the UE from the network entity, the CCH-2, wherein the CCH-2 includes one or more of control information for decoding data and one or more CSI reports; and receive, by the UE from the network entity, the data based on the CCH-1 and CCH-2.

Another example implementation includes an apparatus for wireless communication, including means for receiving, by a UE from a network entity, a CCH-1, wherein the CCH-1 includes at least control information that indicates a resource allocation of data and decoding information for decoding a CCH-2; means for receiving, by the UE from the network entity, the CCH-2, wherein the CCH-2 includes one or more of control information for decoding data and one or more CSI reports; and means for receiving, by the UE from the network entity, the data based on the CCH-1 and CCH-2.

Another example implementation includes a non-statutory computer-readable medium storing instructions for wireless communication, executable by a processor to receive, by a UE from a network entity, a CCH-1, wherein the CCH-1 includes at least control information that indicates a resource allocation of data and decoding information for decoding a CCH-2; receive, by the UE from the network entity, the CCH-2, wherein the CCH-2 includes one or more of control information for decoding data and one or more CSI reports; and receive, by the UE from the network entity, the data based on the CCH-1 and CCH-2.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with various aspects of the present disclosure.

DETAILED DESCRIPTION

Figure 1:
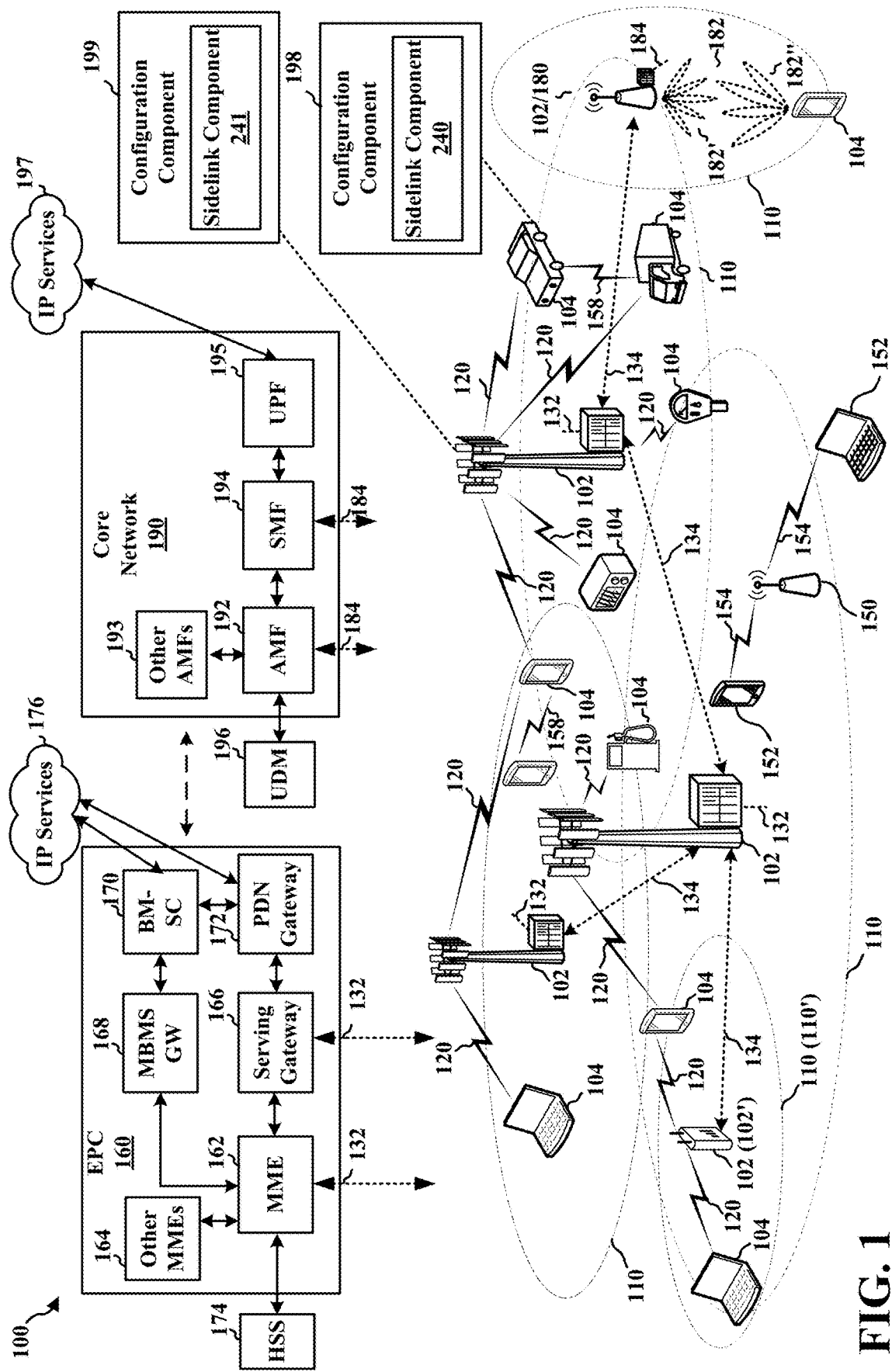
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In an aspect, UE 104 may utilize configuration component 198 and sidelink component 240 to sidelink channel state information (CSI) transmission multiplexing with a scheduling channel (SCH).

In another aspect, base station 102 may utilize configuration component 199 and sidelink component 241 to sidelink CSI transmission multiplexing with a SCH.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters.

The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, and the UEs 104*a/b*, described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/negative acknowledgement (NACK) feedback. The PUSCH carries data, and may additionally be used to carry a buffer status report (BSR), a power headroom report (PHR), and/or UCI.

Figure 3:
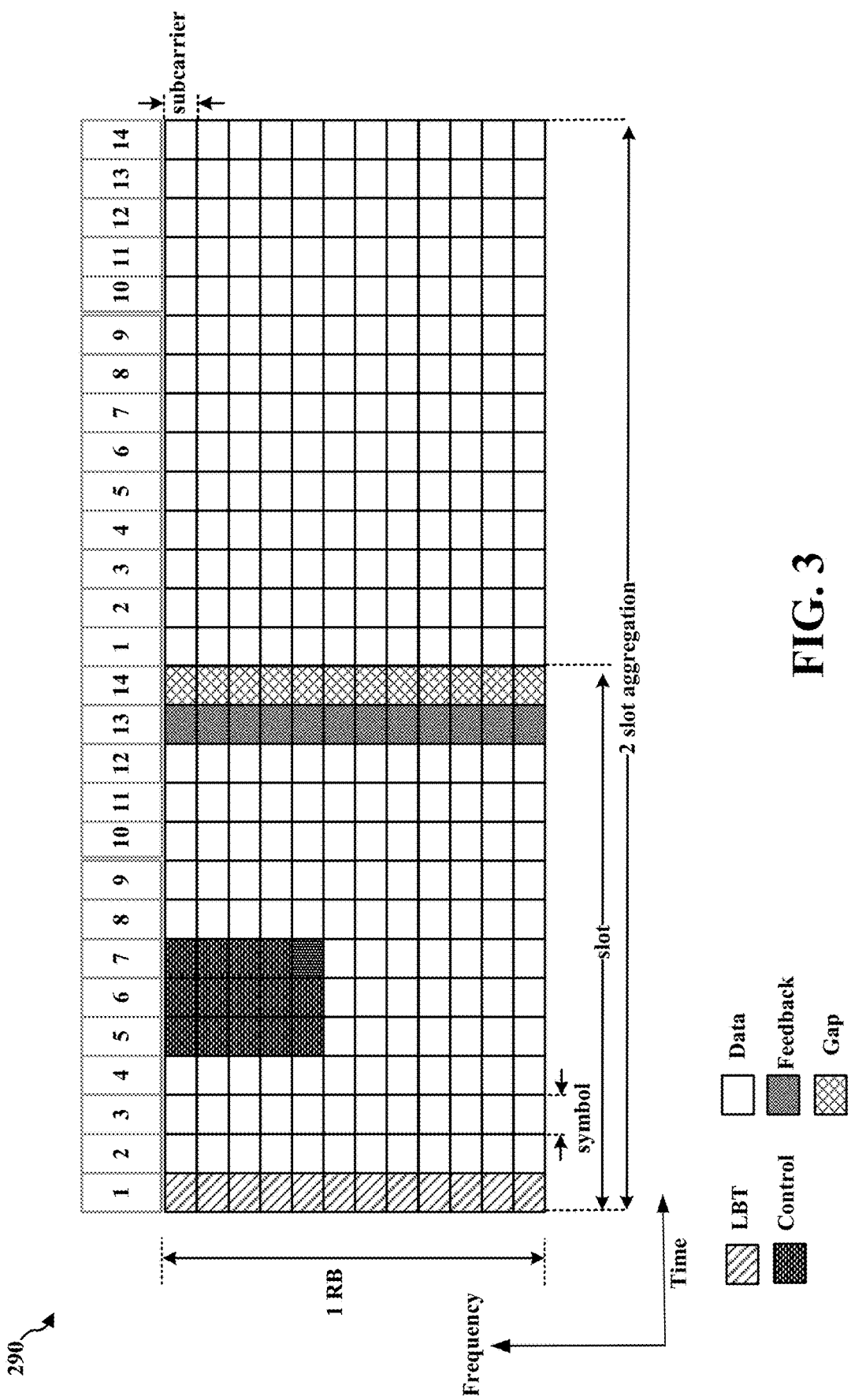
FIG. 3 is an example diagram illustrating a frame structure and resources for sidelink communications, in accordance with various aspects of the present disclosure.

FIG. 3 is a diagram 290 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
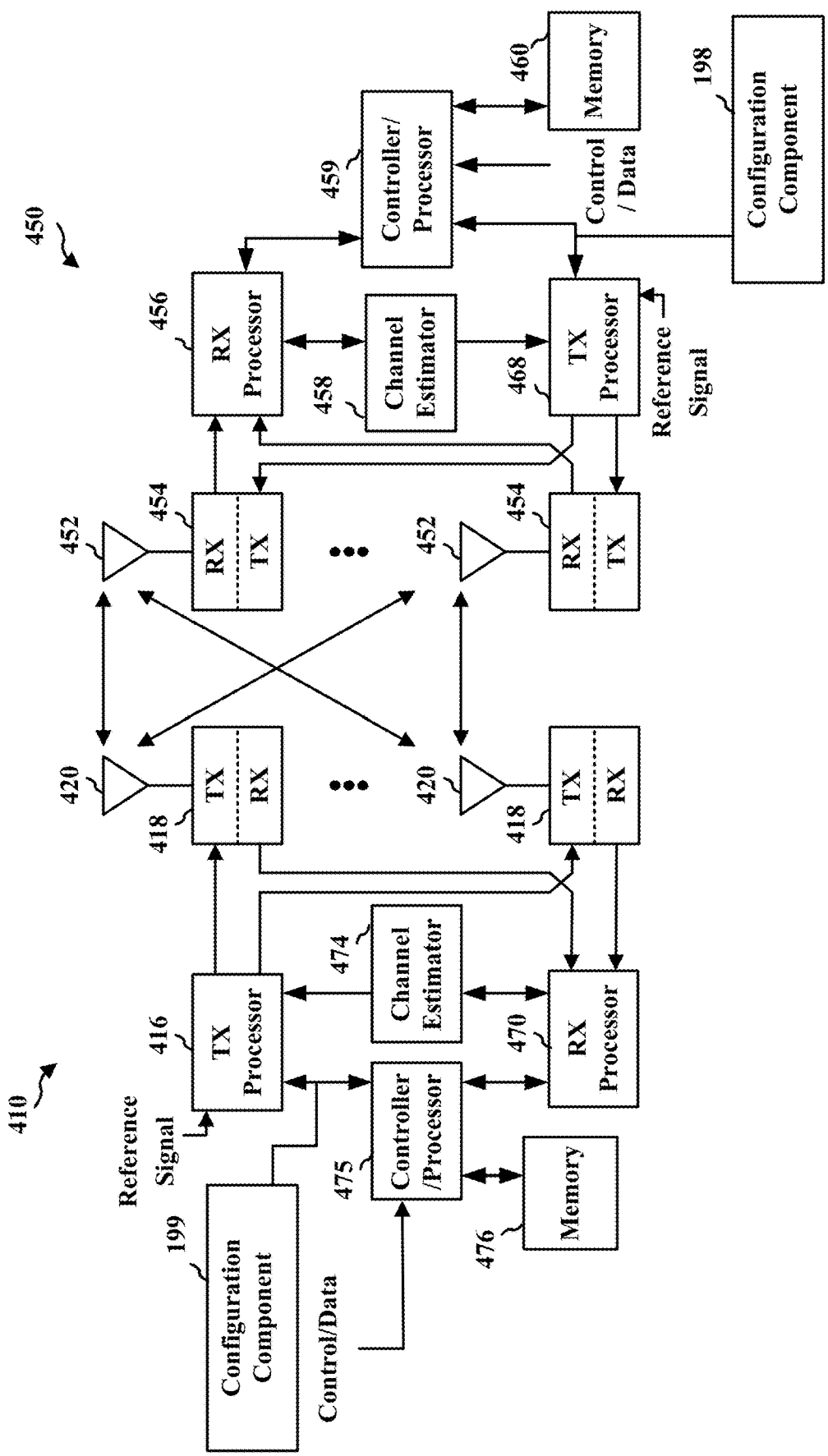
FIG. 4 is a diagram illustrating an example of a base station and user equipment (UE) in an access network, in accordance with various aspects of the present disclosure.

FIG. 4 is a block diagram of a base station 410 in communication with a UE 450 in an access network, where the base station 410 may be an example implementation of base station 102 and where UE 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with the configuration component 198 of FIG. 1.

At least one of the TX processor 416, the RX processor 470, and the controller/processor 475 may be configured to perform aspects in connection with the configuration component 199 of FIG. 1.

Referring to FIGS. 5-10, the described features generally relate to sidelink channel state information (CSI) transmission multiplexing with shared channel (SCH). For example, in Release 16, V2X unicast sidelink supports CSI feedback from a receiver. In an aspect, for CSI acquisition for unicast, CQI/RI reporting is supported and are always reported together. Further, no PMI reporting is supported and multi-rank PSSCH transmission is supported up to two antenna ports. In sidelink, CSI is delivered using PSSCH (including PSSCH containing CSI only) using the resource allocation procedure for data transmission.

In an aspect, CSI for unicast sidelink is required to be sent over PSSCH (e.g., data) including support of SL-CSI transmission on PSSCH without SL-SCH. For example, there are three options for multiplexing. In a first option, the MAC control element (CE) may be used. However, usage of the MAC CE is limited by data link budget and reliability. In a second option, uplink control information (UCI) on PUSCH may be used. However, sidelink communications have support of two stage control information with the second state control multiplexed with PSSCH.

In an aspect, the third option, as described further herein, provides additional information in the second stage control. For example, in an aspect, the present disclosure includes a method, apparatus, and non-statutory computer readable medium for wireless communications for transmitting, by a network entity to a user equipment (UE), a first sidelink control message (CCH-1), wherein the CCH-1 includes at least control information that indicates a resource allocation of data and decoding information for decoding a second sidelink control message (CCH-2); transmitting, by the network entity to the UE, the CCH-2, wherein the CCH-2 includes one or more of control information for decoding data and one or more channel state information (CSI) reports; and transmitting, by the network entity to the UE, the data based on the CCH-1 and CCH-2.

Figure 5:
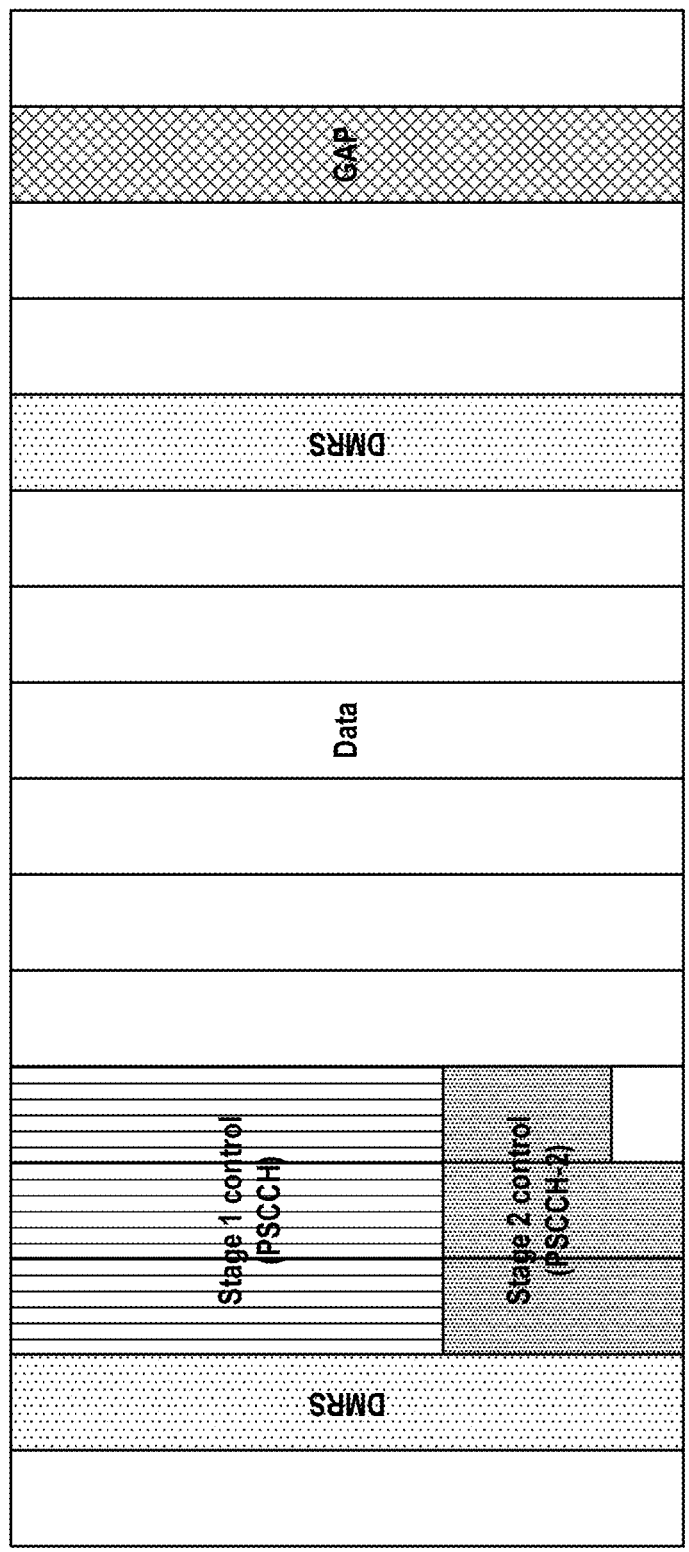
FIG. 5 is a diagram illustrating an example of sidelink communication with stage-1, stage-2, and data multiplexing, in accordance with various aspects of the present disclosure.

FIG. 5 is a diagram 500 illustrating a transmission scheme during sidelink communications. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In an aspect, control information indicating data may be split into two parts CCH-1 and CCH-2. As described in Table 1, CCH-1 may include a plurality of fields associated with the data being transmitted. In an example, Table 2 describes the plurality of fields associated with CCH-2.

TABLE 1

CCH-1

| Fields | Num bits | Comments |
|---|---|---|
| #Slots | 3 | Indicated the #slots aggregated for this transmission |
| Joint time frequency resource reservation for retransmission | 9 | Time-frequency resources used by SCH + CCH-2, and additionally the future time - frequency resources being reserved for retransmission |
| Periodicity If same resource is reserved for future periodic Tx | 4 | If periodic traffic |
| QoS (Only Priority) | 3 | Priority information |
| Control Exclusion distance | 4 | Exclusion region to follow for reserved resources |
| CCH-2 format indicator + CCH-2/SCH rate offset | 4 | |
| DMRS Pattern | 2 | Potentially more #bits if dynamic selection of Type 1 and Type 2 is supported |
| MCS | 5 | |
| TM (rank, layers: (a) single port, (b) rank-2, etc.) | 2 | |
| CRC | 24 | |
| Total #bits | 51 | |

TABLE 2

CCH-2

| Fields | Num bits | Comments |
|---|---|---|
| CCH-2 Format 1 (for broadcast) | | |
| Layer-1 source ID | 8 | Note: Rx UEs does HARQ combining based on source ID and desitination ID (to determine the same link), HARQ ID/NDI/RV |
| Layer-1 destination ID | 8 | |
| HARQ process ID | 3 | |
| NDI | 1 | |
| RV ID | 2 | |
| CRC | 24 | |
| Total bits | 46 | |
| CCH-2 Format 2 (for multicast) | | |
| Layer-1 source ID | 8 | Note: Rx UEs does HARQ combining based on source ID and desitination ID (to determine the same link), HARQ ID/NDI/RV |
| Layer-1 destination ID | 8 | |
| HARQ process ID | 3 | |
| NDI | 1 | |
| RV ID | 2 | |

TABLE 2-continued

CCH-2

| Fields | Num bits | Comments |
|---|---|---|
| Zone ID for Distance based NACK | 10 | For multicast NACK functionality |
| NACK distance | 1 | For multicast NACK functionality |
| HARQ ACK/NACK feedback needed | 5 | For multicast NACK functionality |
| CRC | 24 | |
| Total bits | 62 | |
| CCH-2 Format 3 (for unicast) | | |
| Layer-1 source ID | 8 | Note: Rx UEs does HARQ combining based on source ID and desitination ID (to determine the same link), HARQ ID/NDI/RV |
| Layer-1 destination ID | 8 | |
| HARQ process ID | 3 | |
| NDI | 1 | |
| RV ID | 2 | |
| HARQ ACK/NACK feedback needed | 1 | |
| CSI-RS configuration | 2 | |
| OLPC reference Tx power | 4 | For open loop power control |
| CRC | 24 | |
| Total bits | 53 | |

In an aspect, two-stage SCI is supported with information related to channel sensing being carried on the first stage. In an example, the second state may be decoded by using PSCCH DMRS. Further, polar coding used for PDCCH may be applied to the second stage. In an example, the payload size for the first stage may be the same for unicast, groupcast, and broadcast in a resource pool. For broadcast, if there is no additional information required for the second stage, then the second state is not transmitted. After decoding the first stage, the receiver does not need to perform blind decoding of the second stage.

In an aspect, diagram 500 illustrates multiplexing of CCH-1 and CCH-2 across different frequency portions of the same timeslots. For example, resource element (RE) level multiplexing may be performed such as a different physical channel that is RE-level multiplexed with SCH.

Figure 6:
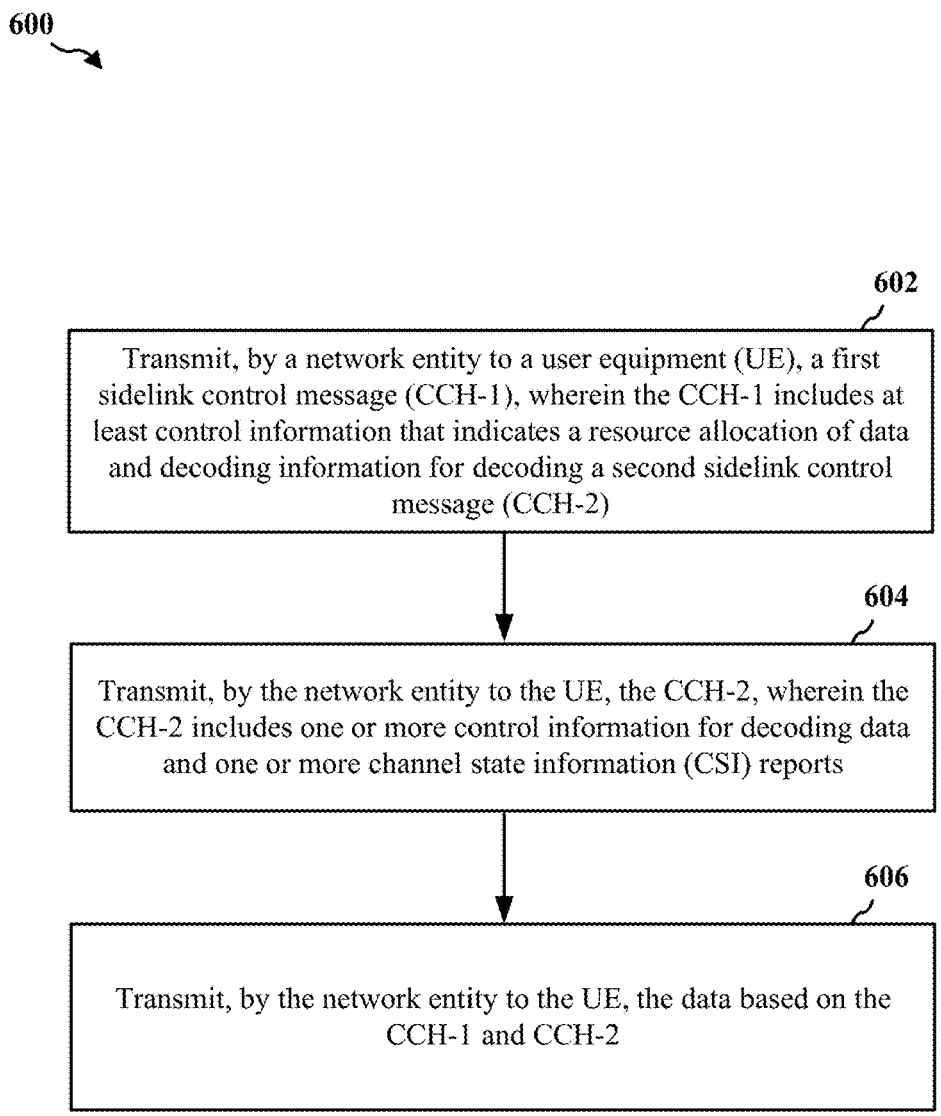
FIG. 6 is an example flowchart of a method of wireless communication of a network entity performing sidelink channel state information (CSI) transmission multiplexing with a shared channel (SCH), in accordance with various aspects of the present disclosure.
Figure 10:
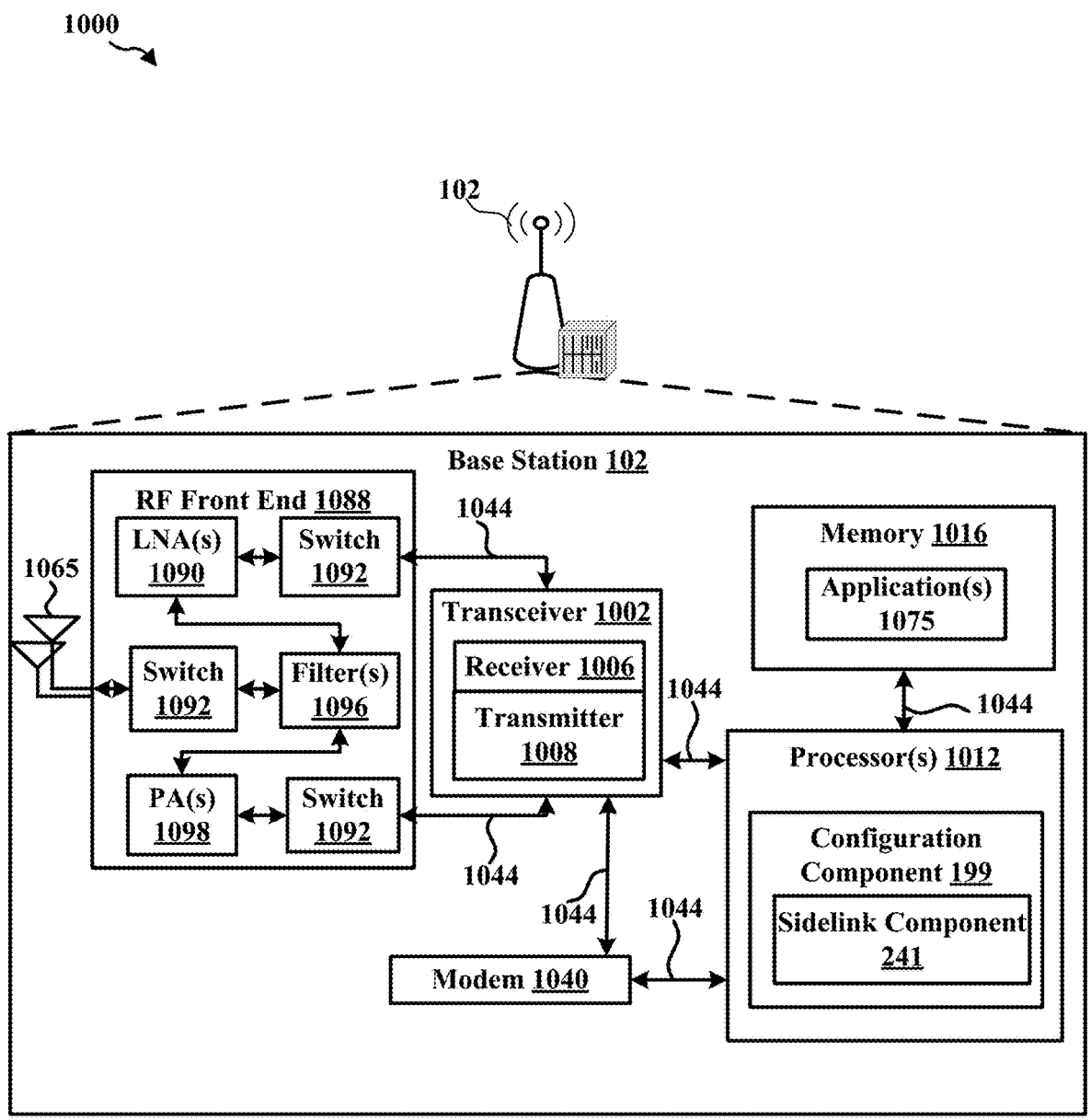
FIG. 10 is a block diagram illustrating an example of a base station, in accordance with various aspects of the present disclosure.

Referring to FIG. 6, an example method 600 of wireless communications which may be performed by the base station 102, which may include one or more components as discussed in FIG. 1, 4, or 10, and which may perform sidelink CSI transmission multiplexing with SCH as discussed with regard to FIGS. 1-5 and 8.

At 602, method 600 includes transmitting, by a network entity to a UE, a CCH-1, wherein the CCH-1 includes at least control information that indicates a resource allocation of data and decoding information for decoding a CCH-2. For example, in an aspect, the network entity 102 may operate one or any combination of antennas 1065, RF front end 1088, transceiver 1002, processor 1012, memory 1016, modem 1040, or configuration component 199/sidelink component 241 to transmit, to a UE 104, a CCH-1, wherein the CCH-1 includes at least control information that indicates a resource allocation of data and decoding information for decoding a CCH-2. Thus, the network entity 102, antennas 1065, RF front end 1088, transceiver 1002, processor 1012, memory 1016, modem 1040, and configuration component 199/sidelink component 241 may define the means for transmitting, by a network entity to a UE, a CCH-1, wherein the CCH-1 includes at least control information that indicates a resource allocation of data and decoding information for decoding a CCH-2.

At 604, method 600 includes transmitting, by the network entity to the UE, the CCH-2, wherein the CCH-2 includes one or more of control information for decoding data and one or more CSI reports. For example, in an aspect, the network entity 102 may operate one or any combination of antennas 1065, RF front end 1088, transceiver 1002, processor 1012, memory 1016, modem 1040, or configuration component 199/sidelink component 241 to transmit, to the UE 104, the CCH-2, wherein the CCH-2 includes one or more of control information for decoding data and one or more CSI reports. Thus, the network entity 102, antennas 1065, RF front end 1088, transceiver 1002, processor 1012, memory 1016, modem 1040, and configuration component 199/sidelink component 241 may define the means for transmitting, by the network entity to the UE, the CCH-2, wherein the CCH-2 includes one or more of control information for decoding data and one or more CSI reports.

At 606, method 600 includes transmitting, by the network entity to the UE, the data based on the CCH-1 and CCH-2. For example, in an aspect, the network entity 102 may operate one or any combination of antennas 1065, RF front end 1088, transceiver 1002, processor 1012, memory 1016, modem 1040, or configuration component 199/sidelink component 241 to transmit, to the UE 104, the data based on the CCH-1 and CCH-2. Thus, the network entity 102, antennas 1065, RF front end 1088, transceiver 1002, processor 1012, memory 1016, modem 1040, and configuration component 199/sidelink component 241 may define the means for transmitting, by the network entity to the UE, the data based on the CCH-1 and CCH-2.

In an example of method 600, the CCH-1 includes an indication for a presence of the one or more CSI reports included in CCH-2.

In an example of method 600, the CCH-1 includes an indication for at least one of a presence or absence of the one or more CSI reports as an alternative CCH-2 control message format.

In an example of method 600, the alternative CCH-2 control message format corresponds to a first CCH-2 message format used for a unicast sidelink transmission based on the CCH-1 indicating the absence of the one or more CSI reports.

In an example of method 600, the alternative CCH-2 control message format corresponds to a second CCH-2 message format used for unicast sidelink transmission based on the CCH-1 indicating the presence of the one or more CSI reports.

In an example of method 600, the CCH-1 includes a number of the one or more CSI reports present in the CCH-2.

In an example of method 600, a length of an alternative CCH-2 control message format is variable based on the number of the one or more CSI reports present in the CCH-2.

In an example of method 600, the one or more CSI reports include one or more channel quality indicator (CQI), rank indicator (RI), pre-coding matrix indicator (PMI), and sidelink-reference signal received power (SL-RSRP).

In an example of method 600, the one or more CSI reports include information corresponding to the channel state information-reference signal (CSI-RS) resources determined based on CSI.

In an example of method 600, the CSI-RS resources are indicated based on one or more of a slot number associated with a transmission of the CS-RS resources, a frequency allocation, and a hybrid automatic repeat request identification (HARQ ID) and redundancy version identification (RV ID) of a data transmission that included the CSI-RS resources.

In an example of method 600, the configuration component 199/sidelink component 241, such as in conjunction with transceiver 1002, processor 1012, memory 1016, or modem 1040, is configured to determine whether the one or more CSI reports are included in the CCH-2; and selecting an modulation code scheme (MCS) of the CCH-2 based at least on a determination of whether the one or more CSI reports are included in the CCH-2.

In an example of method 600, a spectral efficiency is based on one or more of a number of information bits of data, a number of resource elements used for data and control transmission, and a modulation order of data transmissions.

In an example of method 600, the configuration component 199/sidelink component 241, such as in conjunction with transceiver 1002, processor 1012, memory 1016, or modem 1040, is configured to select a scaling value based on a determination of whether the one or more CSI reports are included in the CCH-2.

In an example of method 600, the configuration component 199/sidelink component 241, such as in conjunction with transceiver 1002, processor 1012, memory 1016, or modem 1040, configured to transmit the CCH-2 including the one or more CSI reports further comprises transmitting the CCH-2 including the one or more CSI reports without sidelink-shared channel (SL-SCH).

In an example of method 600, the configuration component 199/sidelink component 241, such as in conjunction with transceiver 1002, processor 1012, memory 1016, or modem 1040, configured to transmit the CCH-2 including the one or more CSI reports without SL-SCH further comprises transmitting the CCH-2 including the one or more CSI reports without SL-SCH based on a priority of a transmission that included the CSI-RS exceeding a priority threshold, a time delay from a reception of the CSI-RS exceeding a configured time slot threshold and an indication that the UE did not have any SL-SCH transmission opportunity in a time corresponding to the reception to a peer UE, and if a transmitter indicates to transmitting the CSI without the SL-SCH.

In an example of method 600, the priority of the transmission that included the CSI-RS is indicated in CCH-1.

In an example of method 600, the configuration component 199/sidelink component 241, such as in conjunction with transceiver 1002, processor 1012, memory 1016, or modem 1040, is configured to set a priority of the transmission of the CCH-2 to be the same as a priority of the transmission of the CSI-RS corresponding to a peer UE transmission that included the CSI-RS.

In an example of method 600, the configuration component 199/sidelink component 241, such as in conjunction with transceiver 1002, processor 1012, memory 1016, or modem 1040, is configured to set a packet delay budget (PDB) of the transmission to be the same as a PDB of the transmission of the CSI-RS corresponding to a peer UE transmission that included the CSI-RS.

In an example of method 600, at least one of the CCH-1 and CCH-2 indicate that no HARQ feedback is expected for transmitting the CCH-2 including the one or more CSI reports without SL-SCH.

In an example of method 600, at least one of the CCH-1 and CCH-2 indicate that an ACK signal is expected for a successful decode of CCH-2.

In an example of method 600, a transmission size is fixed to a subchannel and a time slot, and wherein a size of the subchannel is configured for a resource pool used for transmitting the CCH-2 including the one or more CSI reports without SL-SCH.

In an example, method 600 further includes determining a number of resource elements for transmitting the CCH-2 based on a specified coding rate and a specified modulation order for transmitting the data and a scaling offset factor.

In an example of method 600, the scaling offset factor is configured for the UE.

In an example of method 600, the scaling offset factor is a function of a size of a subchannel and a subcarrier spacing, and wherein the size of the subchannel channel corresponds to a minimum frequency allocation of the transmission.

In an example of method 600, the configuration component 199/sidelink component 241, such as in conjunction with transceiver 1002, processor 1012, memory 1016, or modem 1040, is configured to determine a number of resource elements for transmitting the CCH-2 based on a specified coding rate and a specified modulation order for transmitting the CCH-2.

In an example of method 600, the specified coding rate and the specified modulation order are configured to the UE.

In an example of method 600, the configuration component 199/sidelink component 241, such as in conjunction with transceiver 1002, processor 1012, memory 1016, or modem 1040, is configured to perform a rank-1 single port transmission.

In an example of method 600, the configuration component 199/sidelink component 241, such as in conjunction with transceiver 1002, processor 1012, memory 1016, or modem 1040, is configured to determine a transport block (TB) size of a dummy padding bits for SL-SCH based on at least one of a frequency and time allocation of the transmission of the CCH-2, a number of resource elements available for transmission of data information bits, and a number of resource elements used to transmit CCH-2 control information bits.

In an example of method 600, the data transmission is a sidelink physical shared channel (PSSCH) that carries at least the sidelink shared channel (SL-SCH).

Figure 7:
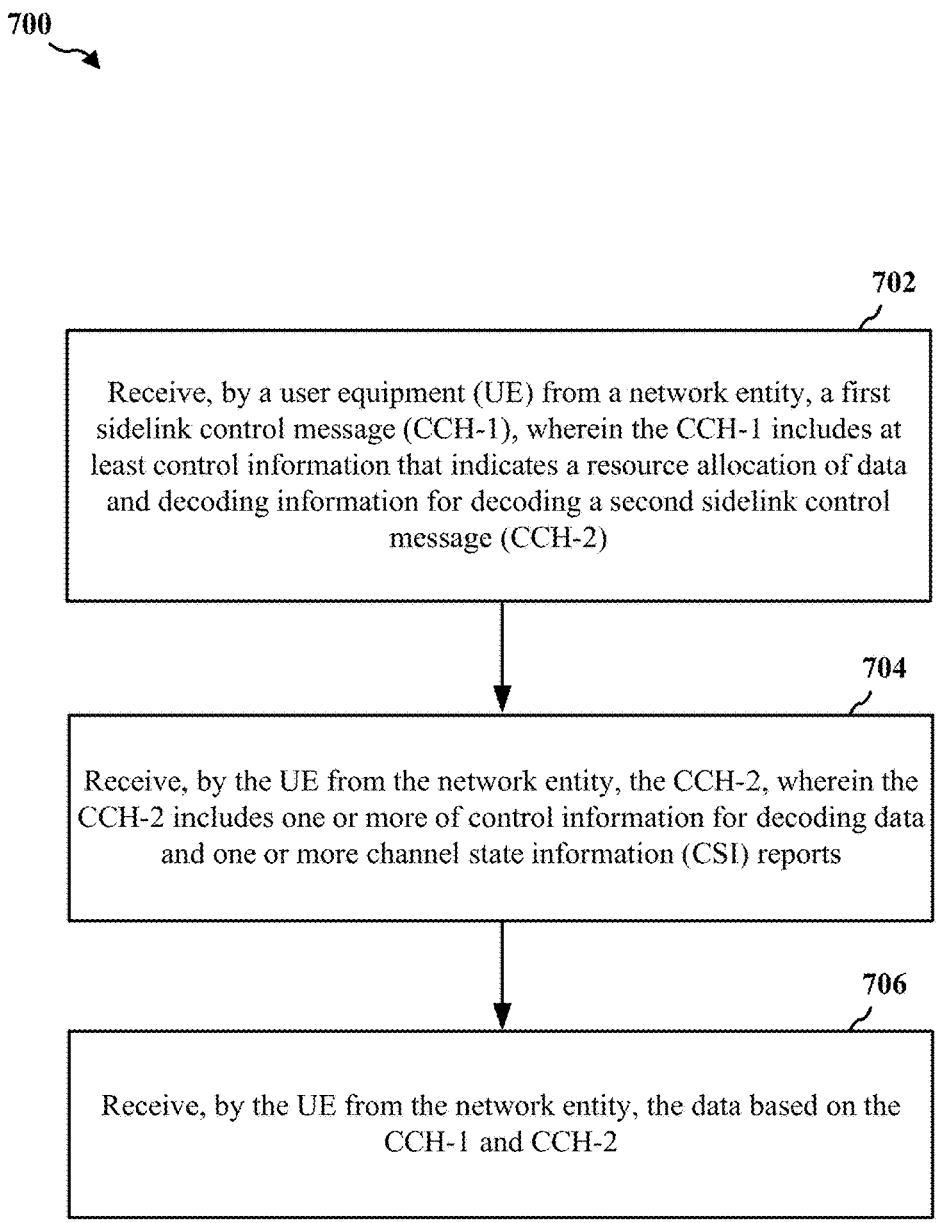
FIG. 7 is another example flowchart of a method of wireless communication of a network entity performing sidelink CSI transmission multiplexing with a SCH, in accordance with various aspects of the present disclosure.
Figure 9:
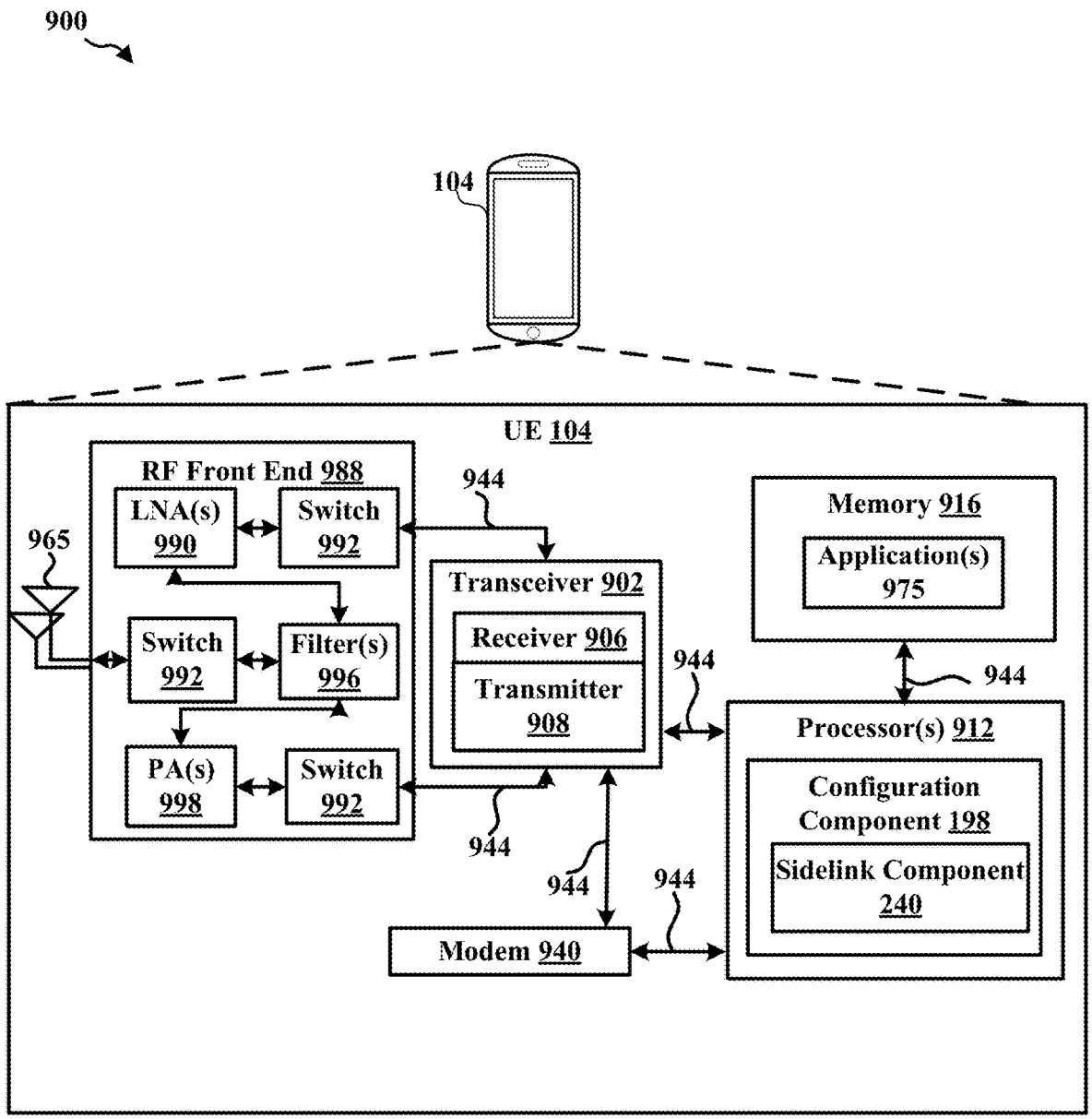
FIG. 9 is a block diagram illustrating an example of a UE, in accordance with various aspects of the present disclosure.

Referring to FIG. 7, an example method 700 of wireless communications may be performed by the UE 104, which may include one or more components as discussed in FIG. 1, 4, or 9, and which may perform sidelink CSI transmission multiplexing with SCH as discussed above with regard to FIGS. 1-5.

At 702, method 700 includes receiving, by a UE from a network entity, a first sidelink CCH-1, wherein the CCH-1 includes at least control information that indicates a resource allocation of data and decoding information for decoding a second sidelink CCH-2. For example, in an aspect, the UE 104 may operate one or any combination of antennas 965, RF front end 988, transceiver 902, processor 912, memory 916, modem 940, or configuration component 198/sidelink component 240 to receive, from a network entity 102, a first sidelink CCH-1, wherein the CCH-1 includes at least control information that indicates a resource allocation of data and decoding information for decoding a second sidelink CCH-2. Thus, the UE 104, antennas 965, RF front end 988, transceiver 902, processor 912, memory 916, modem 940, and communication component 127 may define the means for receiving, by a UE from a network entity, a first sidelink CCH-1, wherein the CCH-1 includes at least control information that indicates a resource allocation of data and decoding information for decoding a second sidelink CCH-2.

At 704, method 700 includes receiving, by the UE from the network entity, the CCH-2, wherein the CCH-2 includes one or more of control information for decoding data and one or more CSI reports. For example, in an aspect, the UE 104 may operate one or any combination of antennas 965, RF front end 988, transceiver 902, processor 912, memory 916, modem 940, or configuration component 198/sidelink component 240 to receive, from the network entity 102, the CCH-2, wherein the CCH-2 includes one or more of control information for decoding data and one or more CSI reports. Thus, the UE 104, antennas 965, RF front end 988, transceiver 902, processor 912, memory 916, modem 940, and communication component 127 may define the means for receiving, by the UE from the network entity, the CCH-2, wherein the CCH-2 includes one or more of control information for decoding data and one or more CSI reports.

At 706, method 700 includes receiving, by the UE from the network entity, the data based on the CCH-1 and CCH-2. For example, in an aspect, the UE 104 may operate one or any combination of antennas 965, RF front end 988, transceiver 902, processor 912, memory 916, modem 940, or configuration component 198/sidelink component 240 to receive, from the network entity 102, the data based on the CCH-1 and CCH-2. Thus, the UE 104, antennas 965, RF front end 988, transceiver 902, processor 912, memory 916, modem 940, and communication component 127 may define the means for receiving, by the UE from the network entity, the data based on the CCH-1 and CCH-2.

In an example of method 700, the CCH-1 includes an indication for a presence of the one or more CSI reports included in CCH-2.

In an example of method 700, the CCH-1 includes an indication for at least one of a presence or absence of the one or more CSI reports as an alternative CCH-2 control message format.

In an example of method 700, the alternative CCH-2 control message format corresponds to a first CCH-2 message format used for a unicast sidelink transmission based on the CCH-1 indicating the absence of the one or more CSI reports.

In an example of method 700, the alternative CCH-2 control message format corresponds to a second CCH-2 message format used for unicast sidelink transmission based on the CCH-1 indicating the presence of the one or more CSI reports.

In an example of method 700, the CCH-1 includes a number of the one or more CSI reports present in the CCH-2.

In an example of method 700, a length of an alternative CCH-2 control message format is variable based on the number of the one or more CSI reports present in the CCH-2.

In an example of method 700, the one or more CSI reports include one or more channel quality indicator (CQI), rank indicator (RI), pre-coding matrix indicator (PMI), and side-link-reference signal received power (SL-RSRP).

In an example of method 700, the one or more CSI reports include information corresponding to the channel state information-reference signal (CSI-RS) resources determined based on CSI.

In an example of method 700, the CSI-RS resources are indicated based on one or more of a slot number associated with a transmission of the CS-RS resources, a frequency allocation, and a hybrid automatic repeat request identification (HARQ ID) and redundancy version identification (RV ID) of a data transmission that included the CSI-RS resources.

In an example of method 700, the configuration component 198/sidelink component 240, such as in conjunction with transceiver 902, processor 912, memory 916, or modem 940, configured to transmit the CCH-2 including the one or more CSI reports further comprises transmitting the CCH-2 including the one or more CSI reports without sidelink-synchronization channel (SL-SCH).

In an example of method 700, the configuration component 198/sidelink component 240, such as in conjunction with transceiver 902, processor 912, memory 916, or modem 940, configured to transmit the CCH-2 including the one or more CSI reports without SL-SCH further comprises transmitting the CCH-2 including the one or more CSI reports without SL-SCH based on a priority of a transmission that included the CSI-RS exceeding a priority threshold, a time delay from a reception of the CSI-RS exceeding a configured time slot threshold and an indication that the UE did not have any SL-SCH transmission opportunity in a time corresponding to the reception to a peer UE, and if a transmitter indicates to transmitting the CSI without the SL-SCH.

In an example of method 700, the priority of the transmission that included the CSI-RS is indicated in CCH-1.

In an example of method 700, at least one of the CCH-1 and CCH-2 indicate that no HARQ feedback is expected for transmitting the CCH-2 including the one or more CSI reports without SL-SCH.

In an example of method 700, at least one of the CCH-1 and CCH-2 indicate that an ACK signal is expected for a successful decode of CCH-2.

In an example of method 700, a transmission size is fixed to a subchannel and a time slot, and wherein a size of the subchannel is configured for a resource pool used for transmitting the CCH-2 including the one or more CSI reports without SL-SCH.

In an example of method 700, the UE 104 may perform a rank-1 single port reception.

In an example of method 700, the data transmission is a sidelink physical shared channel (PSSCH) that carries at least the sidelink shared channel (SL-SCH).

Figure 8:
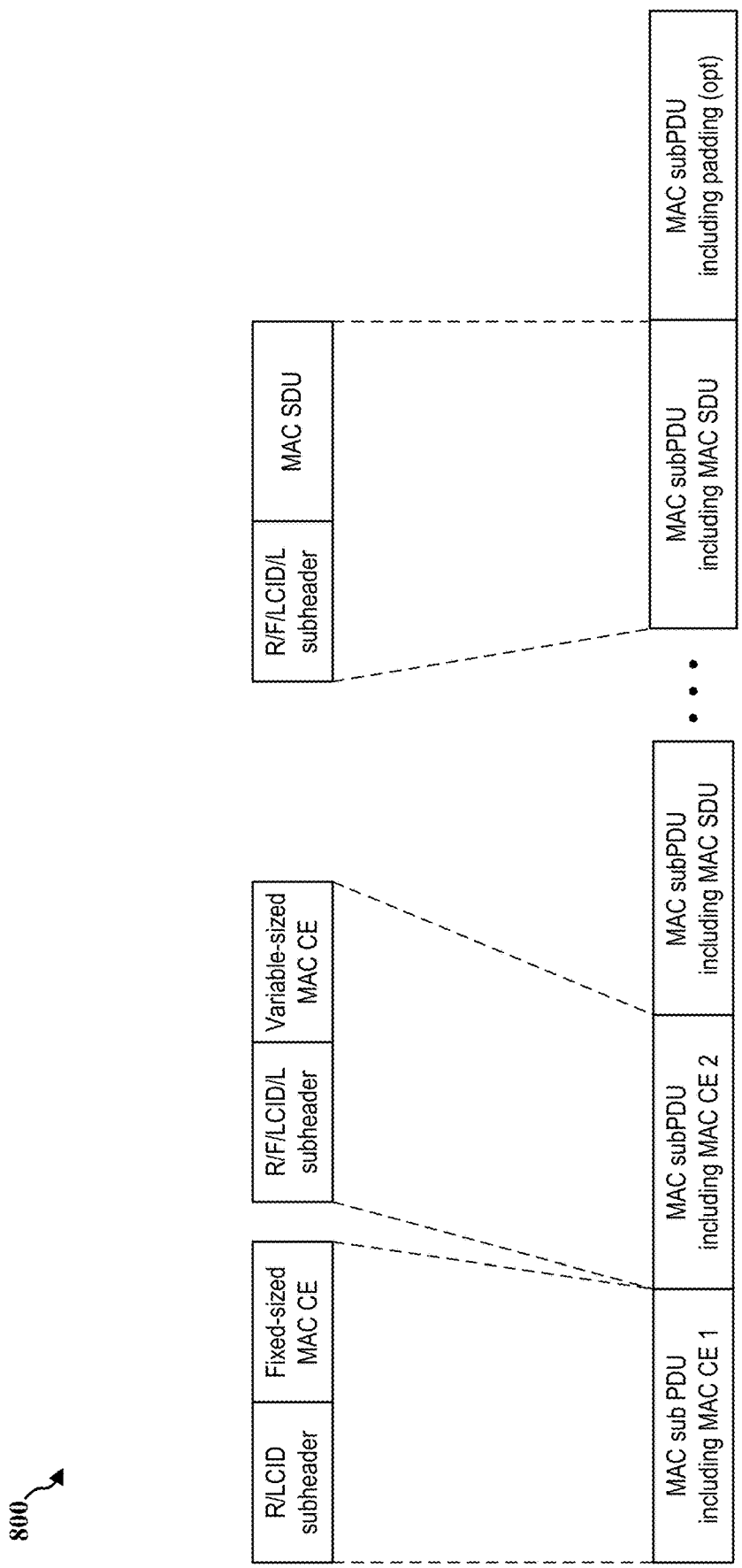
FIG. 8 is a diagram illustrating an example of a downlink media access control (MAC) packet data unit (PDU) for sidelink communications, in accordance with various aspects of the present disclosure.

FIG. 8 is a diagram 800 illustrating an example of a downlink media access control (MAC) packet data unit (PDU) for sidelink communications. As mentioned above, sidelink communication generally includes any type of D2D communication. D2D communications may be used in applications such as, but not limited to, V2X or vehicle to any other device type of communications, sensor networks, public safety-related communication services with limited infrastructure availability, or any other such type of application.

In an aspect, diagram 800 illustrates an example of MAC PDU formation. For example, if no MAC SDU (i.e., no SCH) is transmitted, then the MAC generates only the last MAC subPDU with all padding. Further, the transport block (TB) size of the MAC subPDU is based at least on the resource allocation.

In an aspect, for degerming the modulation coding scheme (MCS) of the CCH-2 based on the SCH SE, a two-step procedure may be performed. For example, in step 1, the desired spectral efficiency of the CCH-2 is computed as a function of data SE. Further, in step 2, the MCS is determined given the scaled SE for the CCH-2 based on three options. These options include being similar to NR UCI on PUSCH, using MCS optional for the resulting SE of the CCH-2, or a fixed CCH-2 modulation to QPSK.

Referring to FIG. 9, one example of an implementation of UE 104 may include a variety of components, some of which have already been described above and are described further herein, including components such as one or more processors 912 and memory 916 and transceiver 902 in communication via one or more buses 944, which may operate in conjunction with modem 940 and/or configuration component 198 for communicating sidelink capability information.

In an aspect, the one or more processors 912 can include a modem 940 and/or can be part of the modem 940 that uses one or more modem processors. Thus, the various functions related to configuration component 198 may be included in modem 940 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 940 associated with configuration component 198 may be performed by transceiver 902.

Also, memory 916 may be configured to store data used herein and/or local versions of applications 975 or communicating component 942 and/or one or more of its subcomponents being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining configuration component 198 and/or one or more of its subcomponents, and/or data associated therewith, when UE 104a is operating at least one processor 912 to execute configuration component 198 and/or one or more of its subcomponents.

Transceiver 902 may include at least one receiver 906 and at least one transmitter 908. Receiver 906 may include hardware and/or software executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102. Additionally, receiver 906 may process such received signals, and also may obtain measurements of the signals, such as, but not limited to, Ec/Io, signal-to-noise ratio (SNR), reference signal received power (RSRP), received signal strength indicator (RSSI), etc. Transmitter 908 may include hardware and/or software executable by a processor for transmitting data, the code comprising instructions and being stored in a memory (e.g., computer-readable medium). A suitable example of transmitter 908 may including, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 104 can communicate with, for example, one or more base stations 102 or one or more cells associated with one or more base stations 102. In an aspect, for example, modem 940 can configure transceiver 902 to operate at a specified frequency and power level based on the UE configuration of the UE 104a and the communication protocol used by modem 940.

In an aspect, modem 940 can be a multiband-multimode modem, which can process digital data and communicate with transceiver 902 such that the digital data is sent and received using transceiver 902. In an aspect, modem 940 can be multiband and be configured to support multiple frequency bands for a specific communications protocol. In an aspect, modem 940 can be multimode and be configured to support multiple operating networks and communications protocols. In an aspect, modem 940 can control one or more components of UE 104a (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104*a* as provided by the network during cell selection and/or cell reselection.

In an aspect, communicating component 942 can optionally include mode determining component 952. For example, upon receiving an anchor signal in an initial bandwidth portion from a network entity 102, the anchor signal triggering an initial access procedure for the UE 104*a*, mode determining component 952 may determine whether to operate in a wideband OFDM mode or a wideband SC-FDM mode in response to receiving the anchor signal. Communicating component 942 may then transmit a capability report message to the network entity 102 based on the determination by the mode determining component 952 of whether to operate in the wideband OFDM mode or the wideband SC-FDM mode In an aspect, the processor(s) 912 may correspond to one or more of the processors described in connection with the UE in FIG. 4. Similarly, the memory 916 may correspond to the memory described in connection with the UE in FIG. 4.

Referring to FIG. 10, one example of an implementation of base station 102 (e.g., a base station 102, as described above) may include a variety of components, some of which have already been described above, but including components such as one or more processors 1012 and memory 1016 and transceiver 1002 in communication via one or more buses 1044, which may operate in conjunction with modem 1040 and configuration component 199 for communicating sidelink capability information.

The transceiver 1002, receiver 1006, transmitter 1008, one or more processors 1012, memory 1016, applications 1075, buses 1044, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

In an aspect, the processor(s) 1012 may correspond to one or more of the processors described in connection with the base station in FIG. 4. Similarly, the memory 1016 may correspond to the memory described in connection with the base station in FIG. 4.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
transmitting, by a network entity to a user equipment (UE), a first sidelink control message (CCH-1), wherein the CCH-1 includes at least control information that indicates a resource allocation of data and decoding information for decoding a second sidelink control message (CCH-2);
transmitting, by the network entity to the UE, the CCH-2, wherein the CCH-2 includes one or more of control information for decoding data and is configured to include one or more channel state information (CSI) reports;
wherein the CCH-1 includes an indication of at least one of a presence or an absence of the one or more CSI reports included in the CCH-2; and
transmitting, by the network entity to the UE, the data based on the CCH-1 and the CCH-2.

2. The method of claim 1, wherein the indication indicates the presence of the one or more CSI reports included in the CCH-2.

3. The method of claim 1, wherein the indication of the at least one of the presence or the absence of the one or more CSI reports comprises an alternative CCH-2 control message format.

4. The method of claim 3, wherein the alternative CCH-2 control message format corresponds to at least one of a first CCH-2 message format used for a unicast sidelink transmission based on the CCH-1 indicating the absence of the one or more CSI reports or a second CCH-2 message format used for the unicast sidelink transmission based on the CCH-1 indicating the presence of the one or more CSI reports.

5. The method of claim 1, wherein the one or more CSI reports include one or more channel quality indicator (CQI), rank indicator (RI), pre-coding matrix indicator (PMI), and sidelink-reference signal received power (SL-RSRP).

6. The method of claim 1, wherein the one or more CSI reports include information corresponding to channel state information-reference signal (CSI-RS) resources determined based on at least one CSI.

7. The method of claim 1, further comprising:
determining whether the one or more CSI reports are included in the CCH-2; and selecting a modulation code scheme (MCS) of the CCH-2 based at least on a determination of whether the one or more CSI reports are included in the CCH-2.

8. The method of claim 7, further comprising selecting a scaling value based on the determination of whether the one or more CSI reports are included in the CCH-2.

9. The method of claim 1, wherein transmitting the CCH-2 further comprises transmitting the CCH-2 including the one or more CSI reports without sidelink-synchronization channel (SL-SCH).

10. The method of claim 9, further comprising setting a first priority of transmission of the CCH-2 to be a same priority as a second priority of transmission of a channel state information-reference signal (CSI-RS) corresponding to a peer UE transmission that included the CSI-RS.

11. The method of claim 9, further comprising setting a first packet delay budget (PDB) of the transmission of the CCH-2 to be a same PDB as a second PDB of transmission of a channel state information-reference signal (CSI-RS) corresponding to a peer UE transmission that included the CSI-RS.

12. The method of claim 9, wherein at least one of the CCH-1 and the CCH-2 indicate either that no hybrid automatic repeat request (HARQ) feedback is expected for transmitting the CCH-2 including the one or more CSI reports without the SL-SCH or that an acknowledgement (ACK) signal is expected for a successful decode of the CCH-2.

13. The method of claim 9, further comprising determining a number of resource elements for transmitting the CCH-2 based on a specified coding rate and a specified modulation order for transmitting the data and a scaling offset factor.

14. The method of claim 9, further comprising determining a number of resource elements for transmitting the CCH-2 based on a specified coding rate and a specified modulation order for transmitting the CCH-2.

15. The method of claim 1, wherein transmitting the data comprises transmitting a sidelink physical shared channel (PSSCH) that carries at least a sidelink shared channel (SL-SCH).

16. A method of wireless communication, comprising:
receiving, by a user equipment (UE) from a network entity, a first sidelink control message (CCH-1), wherein the CCH-1 includes at least control information that indicates a resource allocation of data and decoding information for decoding a second sidelink control message (CCH-2);
receiving, by the UE from the network entity, the CCH-2, wherein the CCH-2 includes one or more of control information for decoding data and is configured to include one or more channel state information (CSI) reports;
wherein the CCH-1 includes an indication of at least one of a presence or an absence of the one or more CSI reports included in the CCH-2; and
receiving, by the UE from the network entity, the data based on the CCH-1 and the CCH-2.

17. The method of claim 16, wherein the indication indicates the presence of the one or more CSI reports included in the CCH-2.

18. The method of claim 16, wherein the indication of the at least one of the presence or the absence of the one or more CSI reports comprises an alternative CCH-2 control message format.

19. The method of claim 18, wherein the alternative CCH-2 control message format corresponds to at least one of a first CCH-2 message format used for a unicast sidelink transmission based on the CCH-1 indicating the absence of the one or more CSI reports or a second CCH-2 message format used for the unicast sidelink transmission based on the CCH-1 indicating the presence of the one or more CSI reports.

20. The method of claim 18, wherein the CCH-1 indicates a number of the one or more CSI reports present in the CCH-2.

21. The method of claim 16, wherein the one or more CSI reports include one or more channel quality indicator (CQI), rank indicator (RI), pre-coding matrix indicator (PMI), and sidelink-reference signal received power (SL-RSRP).

22. The method of claim 16, wherein the one or more CSI reports include information corresponding to channel state information-reference signal (CSI-RS) resources determined based on at least one CSI.

23. The method of claim 16, wherein receiving the CCH-2 further comprises receiving the CCH-2 including the one or more CSI reports without sidelink-synchronization channel (SL-SCH).

24. The method of claim 23, wherein receiving the CCH-2 including the one or more CSI reports without the SL-SCH further comprises receiving the CCH-2 including the one or more CSI reports without the SL-SCH based on at least one of a priority of a transmission that included a channel state information-reference signal (CSI-RS) exceeding a priority threshold, a time delay from a reception of the CSI-RS exceeding a configured time slot threshold and a condition where there was no SL-SCH transmission opportunity during the time delay, or if a transmitter indicates to transmit at least one CSI without the SL-SCH.

25. The method of claim 24, wherein the priority of the transmission that included the CSI-RS is indicated in the CCH-1.

26. The method of claim 23, wherein at least one of the CCH-1 and the CCH-2 indicate that at least no hybrid automatic repeat request (HARQ) feedback is expected for transmitting the CCH-2 including the one or more CSI reports without the SL-SCH or an acknowledgement (ACK) signal is expected for a successful decode of the CCH-2.

27. The method of claim 23, wherein a transmission size is fixed to a subchannel and a time slot, and wherein a size of the subchannel is configured for a resource pool used for transmitting the CCH-2 including the one or more CSI reports without the SL-SCH.

28. The method of claim 16, wherein receiving the data comprises receiving a sidelink physical shared channel (PSSCH) that carries at least a sidelink shared channel (SL-SCH).

29. An apparatus for communication, comprising:
a memory configured to store instructions; and
one or more processors communicatively coupled with the memory, wherein the one or more processors are configured to:
transmit, by a network entity to a user equipment (UE), a first sidelink control message (CCH-1), wherein the CCH-1 includes at least control information that indicates a resource allocation of data and decoding information for decoding a second sidelink control message (CCH-2);
transmit, by the network entity to the UE, the CCH-2, wherein the CCH-2 includes one or more of control information for decoding data and is configured to include one or more channel state information (CSI) reports;

wherein the CCH-1 includes an indication of at least one of a presence or an absence of the one or more CSI reports included in the CCH-2; and transmit, by the network entity to the UE, the data based on the CCH-1 and the CCH-2.

30. An apparatus for communication, comprising:

a memory configured to store instructions; and one or more processors communicatively coupled with the memory, wherein the one or more processors are configured to:

receive, by a user equipment (UE) from a network entity, a first sidelink control message (CCH-1), wherein the CCH-1 includes at least control information that indicates a resource allocation of data and decoding information for decoding a second sidelink control message (CCH-2);

receive, by the UE from the network entity, the CCH-2, wherein the CCH-2 includes one or more of control information for decoding data and is configured to include one or more channel state information (CSI) reports;

wherein the CCH-1 includes an indication of at least one of a presence or an absence of the one or more CSI reports included in the CCH-2; and receive, by the UE from the network entity, the data based on the CCH-1 and the CCH-2.

* * * * *